United States Patent
Don et al.

(10) Patent No.: US 10,565,068 B1
(45) Date of Patent: Feb. 18, 2020

(54) PRIMARY ARRAY DATA DEDUP/COMPRESSION USING BLOCK BACKUP STATISTICS

(71) Applicant: EMC IP HOLDING COMPANY LLC, Hopkinton, MA (US)

(72) Inventors: Arieh Don, Newton, MA (US); Gabriel Benhanokh, Tel-Aviv (IL); Ian Wigmore, Westborough, MA (US); Stephen Smaldone, Woodstock, CT (US)

(73) Assignee: EMC IP Holding Company LLC, Hopkinton, MA (US)

(*) Notice: Subject to any disclaimer, the term of this patent is extended or adjusted under 35 U.S.C. 154(b) by 358 days.

(21) Appl. No.: 15/491,011

(22) Filed: Apr. 19, 2017

(51) Int. Cl.
  *G06F 17/00* (2019.01)
  *G06F 11/14* (2006.01)

(52) U.S. Cl.
  CPC ...... *G06F 11/1464* (2013.01); *G06F 11/1453* (2013.01); *G06F 2201/84* (2013.01)

(58) Field of Classification Search
  CPC ............ G06F 11/1464; G06F 11/1453; G06F 2201/84; G06F 3/0685; G06F 17/30061; G06F 12/145; G06F 9/5077
  USPC ......................................... 707/654, 801, 831
  See application file for complete search history.

(56) References Cited

U.S. PATENT DOCUMENTS

| | | | | |
|---|---|---|---|---|
| 5,239,659 A * | 8/1993 | Rudeseal | ............... | G06F 3/0601 703/24 |
| 5,537,585 A * | 7/1996 | Blickenstaff | .......... | G06F 3/0617 |
| 7,318,138 B1 * | 1/2008 | Usgaonkar | .......... | G06F 11/2092 711/163 |
| 8,543,784 B1 * | 9/2013 | Clifford | ............. | G06F 11/1458 711/162 |
| 8,566,549 B1 * | 10/2013 | Burke | ................... | G06F 3/0611 711/114 |
| 8,688,878 B1 * | 4/2014 | Dolan | ..................... | G06F 3/061 710/33 |
| 8,769,049 B2 * | 7/2014 | Murphy | ............. | G06F 11/3034 707/637 |
| 2007/0233987 A1 * | 10/2007 | Maruyama | ........... | G06F 3/0605 711/165 |
| 2009/0024676 A1 * | 1/2009 | Boyd | .................. | G06F 11/2064 |
| 2010/0274983 A1 * | 10/2010 | Murphy | ............. | G06F 11/1456 711/162 |

(Continued)

*Primary Examiner* — Mohammed R Uddin
(74) *Attorney, Agent, or Firm* — Anderson Gorecki LLP (57) ABSTRACT

A backup copy of a production device is used to quantify suitability of host application data for placement on individual managed drives and virtualized managed drives based on storage capabilities associated with those drives. A data analysis program on a data backup storage array may generate block backup statistics to indicate that a production device or certain chunks, blocks or volumes of host application data are highly compressible or reducible via deduplication. The block backup statistics are sent from the data backup storage array to the primary storage array. The primary storage array uses the block backup statistics to select a particular storage resource with suitable storage capabilities for the data. Highly compressible data may be stored on a storage virtualization storage array with data compression capability, and data that is neither highly compressible nor reducible with deduplication may be stored on local resources.

20 Claims, 7 Drawing Sheets

(56) References Cited

U.S. PATENT DOCUMENTS

| | | | | |
|---|---|---|---|---|
| 2011/0252218 A1* | 10/2011 | Davies | G06F 3/0605 |
| | | | 711/209 |
| 2012/0117028 A1* | 5/2012 | Gold | G06F 11/1451 |
| | | | 707/640 |
| 2013/0318297 A1* | 11/2013 | Jibbe | G06F 3/061 |
| | | | 711/114 |
| 2013/0326159 A1* | 12/2013 | Vijayan | G06F 3/0644 |
| | | | 711/148 |
| 2013/0339643 A1* | 12/2013 | Tekade | G06F 11/1461 |
| | | | 711/162 |
| 2016/0065671 A1* | 3/2016 | Nallathambi | H04L 67/1095 |
| | | | 709/217 |
| 2017/0206020 A1* | 7/2017 | Brown | G06F 3/0608 |
| 2018/0039434 A1* | 2/2018 | Balcha | G06F 3/0619 |

\* cited by examiner

PRIMARY ARRAY DATA DEDUP/COMPRESSION USING BLOCK BACKUP STATISTICS

BACKGROUND

The subject matter of this disclosure is generally related to computer networks in which a data storage system maintains data for multiple host servers and concurrent users. Host servers run data processing applications that may be referred to as host applications. Host application data may be maintained on tangible data storage drives that are managed by storage arrays. The storage arrays may present the storage resources of the drives to the host servers as logical storage devices. The host servers may access the host application data by sending IOs with reference to the logical storage devices. The storage arrays implement the IOs by accessing the tangible data storage drives based on a mapping between the logical storage devices and the tangible storage drives.

SUMMARY

All examples, aspects and features mentioned in this document can be combined in any technically possible way.

In accordance with an aspect, a method comprises: in a data storage system comprising a primary storage array with managed drives and a first storage virtualization storage array that maintains a first virtualized managed drive, where the first storage virtualization storage array has a first storage capability that the primary storage array lacks: quantifying, for each extent of data of a plurality of extents of data, suitability for processing of that extent of data by the first storage capability; selecting a most suitable extent of data based on quantified suitability; and moving the selected most suitable extent of data to the first virtualized managed drive. In some implementations the data storage system comprises a data backup storage array with a backup copy of a production device of the primary storage array, and the method comprises analyzing the backup copy with a data analysis program running on the data backup storage array to quantify suitability for processing each extent of data by the first storage capability. Some implementations comprise the data analysis program generating block backup statistics that represent quantified suitability for processing each extent of data by the first storage capability. Some implementations comprise the primary storage array selecting a set of possible drives from the virtualized managed drive and the managed drives based on performance tiering. Some implementations comprise selecting at least one drive of the set of possible drives based on the quantified suitability for processing each extent of data by the first storage capability. In some implementations comprise the data storage system comprises a second storage virtualization storage array that maintains a second virtualized managed drive, where the second storage virtualization storage array has a second storage capability that the primary storage array and the first storage virtualization storage array lack, and the method comprises the data analysis program running on the data backup storage array quantifying suitability for processing each extent of data by the second storage capability. Some implementations comprise the data analysis program generating block backup statistics that represent quantified suitability for processing each extent of data by the first storage capability and the second storage capability. Some implementations comprise selecting at least one drive of the set of possible drives based on the quantified suitability for processing each extent of data by the first storage capability and the second storage capability. In some implementations the first storage capability is one of: deduplication, compression, power conservation, performance tiering, remote replication, and support for a predetermined number of snaps, and the method comprises quantifying suitability of a production device with respect to the first storage capability. In some implementations the second storage capability is one of: deduplication, compression, power conservation, performance tiering, remote replication, and support for a predetermined number of snaps, and the method comprises quantifying suitability for of a production device with respect to the second storage capability.

In accordance with an aspect an apparatus comprises: a primary storage array with managed drives; a first storage virtualization storage array that maintains a first virtualized managed drive, where the first storage virtualization storage array has a first storage capability that the primary storage array lacks; and an analysis program on non-transitory computer-readable memory that: quantifies, for each extent of data of a plurality of extents of data, suitability for processing of that extent of data by the first storage capability; selects a most suitable extent of data based on quantified suitability; and moves the selected most suitable extent of data to the first virtualized managed drive. In some implementations the data storage system comprises a data backup storage array with a backup copy of a production device of the primary storage array, and the analysis program runs on the data backup storage array and analyzes the backup copy to quantify suitability for processing each extent of data by the first storage capability. In some implementations the data analysis program generates block backup statistics that represent quantified suitability for processing each extent of data by the first storage capability. In some implementations the primary storage array comprises a tiering program on non-transitory computer-readable memory that selects a set of possible drives from the virtualized managed drive and the managed drives based on performance. In some implementations the primary storage array comprises a data placement program on non-transitory computer-readable memory that selects at least one drive of the set of possible drives based on the quantified suitability for processing each extent of data by the first storage capability. Some implementations comprise a second storage virtualization storage array that maintains a second virtualized managed drive, where the second storage virtualization storage array has a second storage capability that the primary storage array and the first storage virtualization storage array lack, and wherein the data analysis program running on the data backup storage array quantifies suitability for processing each extent of data by the second storage capability. In some implementations the data analysis program generates block backup statistics that represent quantified suitability for processing each extent of data by the first storage capability and the second storage capability. In some implementations the data placement program selects at least one drive of the set of possible drives based on the quantified suitability for processing each extent of data by the first storage capability and the second storage capability. In some implementations the first storage capability and the second storage capability are each one of: deduplication, compression, power conservation, performance tiering, remote replication, and support for a predetermined number of snaps.

In accordance with an aspect a system comprises: a primary storage array with managed drives and a production device; a data backup storage array with a backup copy of the production device; a storage virtualization storage array that maintains a virtualized managed drive, where the storage virtualization storage array has a storage capability that the primary storage array lacks; and an analysis program on non-transitory computer-readable memory of the data backup storage array that: quantifies suitability for processing the production device with the storage capability; and generates block backup statistics that represent quantified suitability for processing the production device with the storage capability; and a data placement program on non-transitory computer-readable memory of the primary storage array that: selects either the managed drives or the virtualized managed drive for storage of the production device based on the block backup statistics; and moves the production device in accordance with the selection.

Other aspects, features and implementations may become apparent in view of the detailed description and figures.

DETAILED DESCRIPTION

Specific examples may be presented in this detailed description in order to provide context and convey inventive concepts. The specific examples are not to be considered as limiting. Moreover, the features described herein may be combined in a wide variety of combinations.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
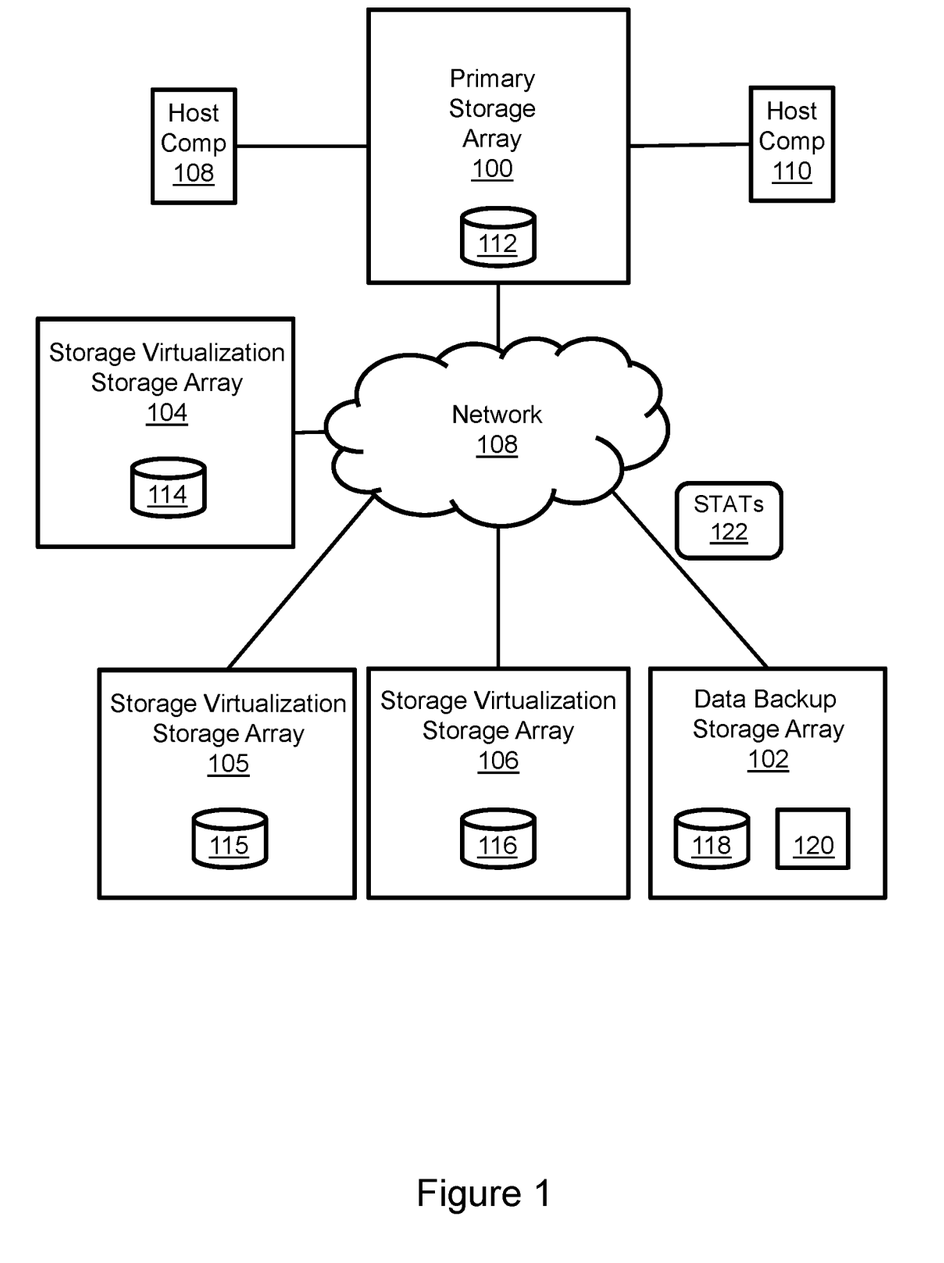
FIG. 1 illustrates a data storage system in which a backup storage array provides block backup statistics to a primary storage array to facilitate data placement.

FIG. 1 illustrates a data storage system that includes a primary storage array 100, a data backup storage array 102, and three storage virtualization storage arrays 104, 105 and 106. All of the storage arrays are interconnected by a network 108. The primary storage array 100 provides data storage services to host applications that run on a plurality of host computers, groups of which are collectively represented by host computer 108 and host computer 110. The primary storage array 100 may store host application data on local storage resources 112 and virtualized storage resources 114, 115, 116 provided respectively by storage virtualization storage arrays 104, 105, 106. The data backup storage array 102 stores a backup copy 118 of all of the host application data that is managed by the primary storage array 100, i.e. including host application data stored on the local storage resources 112 and virtualized storage resources 114, 115, 116.

The storage virtualization storage arrays 104, 105, 106 have a different set of storage capabilities than the primary storage array 100. Examples of storage capabilities that the primary storage array may lack, and which the storage virtualization storage arrays may possess, may include but are not limited to deduplication, compression, power conservation (e.g. a MAID (massive array of idle disks), performance tiering (e.g. in terms of IOPS (input-output operations per second)), remote replication, and support for a large predetermined number of snaps. The mismatch of storage capabilities between the primary storage array 100 and the storage virtualization storage arrays 104, 105, 106 can lead to inefficiencies because the primary storage array lacks information to determine how to efficiently utilize the storage capabilities of the storage virtualization storage arrays. For example and without limitation, the primary storage array may select the virtualized storage resources arbitrarily or solely based only on performance if the primary storage array has a tiering capability. The storage virtualization storage arrays may be capable of determining the results of processing data with their storage capabilities but each storage virtualization storage array maintains only a portion of the host application data and thus lacks information to indicate which host application data would be best suited for storage with the available storage capabilities. However, the data backup storage array has access to a complete copy of the host application data. Moreover, the data backup storage array tends to have available computing capacity because backup operations are typically not in progress at all times. Moreover, the data backup storage array may have some of the storage capabilities or analogous storage capabilities. As will be explained in greater detail below, a data analysis program 120 running on the data backup storage array 102 processes the backup copy 118 to qualify and/or quantify suitability of host application data for placement on individual storage virtualization storage arrays based on the associated storage capabilities relative to treatment of the host application data with those storage capabilities. For example and without limitation, the data analysis program 120 may generate block backup statistics 122 to indicate that a logical device containing host application data is highly compressible or highly reducible via deduplication. The block backup statistics are sent from the data backup storage array to the primary storage array. The primary storage array uses the block backup statistics to select either the local storage resources 112 or one of the virtualized storage resources 114, 115, 116 for storage of the logical device. For example and without limitation, a highly compressible logical device may be stored on a storage virtualization storage array with data compression capability, and a logical device that is neither highly compressible or reducible with deduplication may be stored on the local resources.

Although device level analysis and placement will be described by way of example, it should be understood that analysis and placement may be performed at some other level of granularity. For example and without limitation, blocks, tracks, chunks and other extents of data of a variety of fixed or variable sizes may be analyzed and placed on either the local storage resources or one of the virtualized storage resources such that a logical device is distributed among multiple different resources having different storage capabilities.

Figure 2:
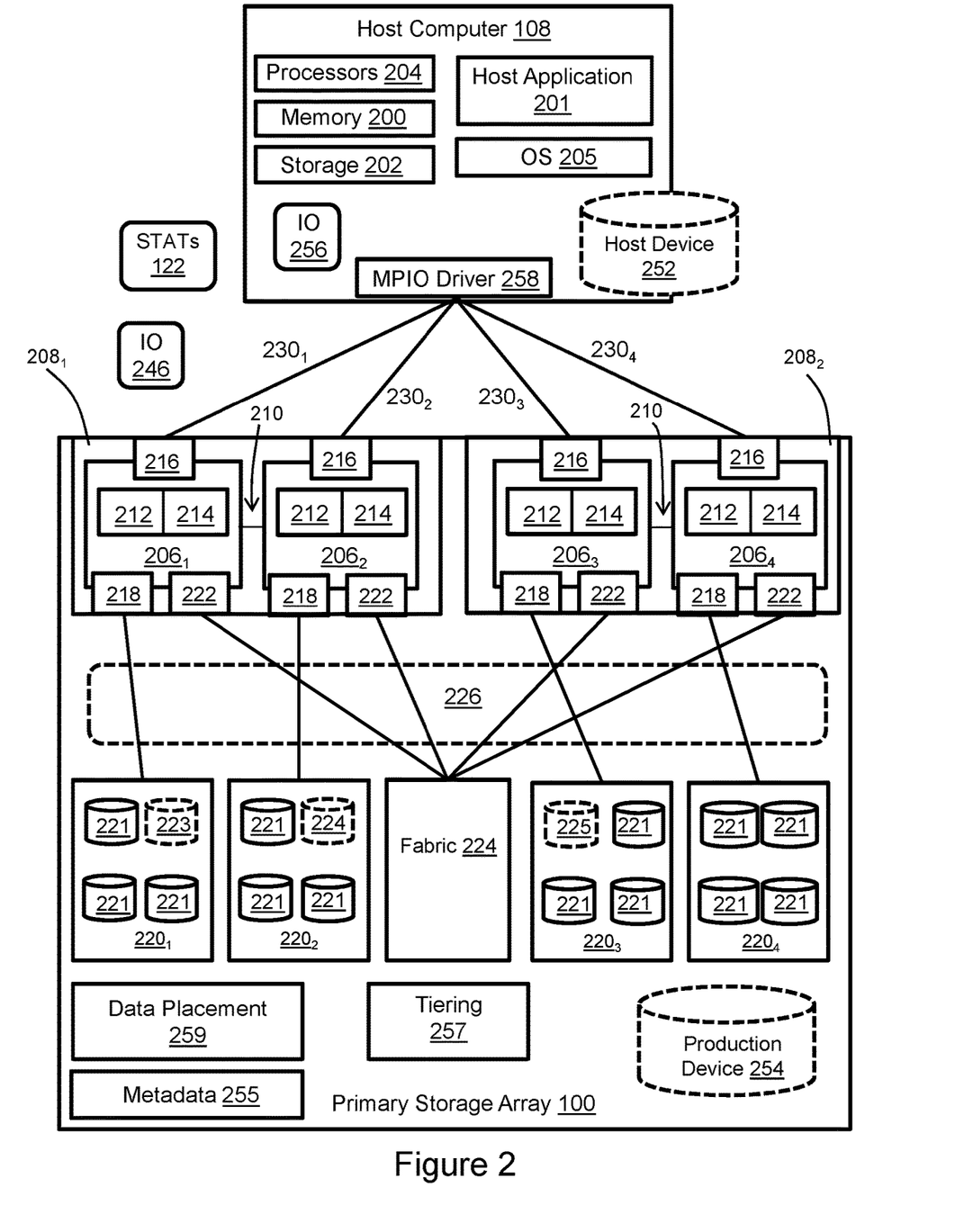
FIG. 2 illustrates the host computer and primary storage array of FIG. 1 in greater detail.

FIG. 2 illustrates the host computer 108 and primary storage array 100 of FIG. 1 in greater detail. The host computer 108 may be a "vanilla" server computer with volatile memory 200, persistent storage 202, one or more tangible processors 204, and an OS (operating system) 205, possibly including a hypervisor. The host computer 108 might support virtual hosts running on virtual machines or containers, and although an external host computer is illustrated, internal hosts may be instantiated within the storage array. A host application 201 runs on the host computer 108. Examples of host applications may include but are not limited to file servers, email servers, block servers and databases. Multiple different host applications may be simultaneously supported by the primary storage array 100. Host computer 110 (FIG. 1) might be identical except for running a different host application for which a different host device and production device are maintained.

The architecture and components of the illustrated primary storage array 100 are specifically designed for providing data storage services. However, the illustrated example is merely provided for context and the primary storage array, data backup storage array, and storage virtualization storage arrays could be implemented in a wide variety of different ways. In the specifically illustrated example the primary storage array 100 includes a plurality of computing nodes $206_1$-$206_4$ such as storage directors, for example and without limitation. Pairs of the computing nodes, e.g. ($206_1$, $206_2$) and ($206_3$, $206_4$), may be organized as storage engines $208_1$, $208_2$, respectively, for purposes of failover between computing nodes. The paired computing nodes of each storage engine may be directly interconnected by communication links 210. Each computing node includes at least one tangible multi-core processor 212 and a local cache 214. The local cache 214 may include, for example and without limitation, volatile memory components such as RAM (random access memory). Each computing node may include one or more FEs 216 (front-end directors, a.k.a. front end adapters) for communicating with the host computer 108. Each computing node $206_1$-$206_4$ may also include one or more BEs 218 (back end directors, a.k.a. back end adapters) for communicating with respective associated back end storage bays $220_1$-$220_4$, thereby enabling access to managed drives 221 that collectively are the local storage resources 112 (FIG. 1). The managed drives 221 may include tangible storage components of one or more technology types, for example and without limitation SSDs such as flash, and HDDs (hard disk drives) such as SATA (Serial Advanced Technology Attachment) and FC (Fibre Channel). Virtualized managed drives 223, 224, 225 are backed by the virtualized storage resources 114, 115, 116 (FIG. 1). Each computing node may also include one or more CAs (channel directors, a.k.a. channel adapters) 222 for communicating with other computing nodes via an interconnecting fabric 224. Each computing node may allocate a portion or partition of its respective local cache 214 to a virtual shared "global" cache 226 that can be accessed by other computing nodes, e.g. via DMA (direct memory access) or RDMA (remote direct memory access).

A production device 254 and a host device 252 are logical volumes that are created to enable the primary storage array 100 to provide storage services to the host application 201. Without limitation, the production device 254 may be referred to as a production device, production volume, production LUN or host LUN, where LUN (Logical Unit Number) is a number used to identify the logical storage volume in accordance with the SCSI (Small Computer System Interface) protocol. The host device 252 is a host computer representation of the production device 254. The host device 252 and the production device 254 are logical storage devices that represent abstraction layers between the managed drives 221, virtualized managed drives 223, 224, 225 and the host application 201. From the perspective of the host application 201, the host device 252 is a single data storage device having a set of contiguous fixed-size LBAs (logical block addresses) on which data used by the host application resides. However, the data used by the host application may actually be maintained by the computing nodes $206_1$-$206_4$ at non-contiguous addresses on various different managed drives 221 and virtualized managed drives 223, 224, 225. Moreover, there may be multiple host computers with different host devices that represent the production device.

In order to service IOs from the host application 201, the primary storage array 100 maintains metadata 255 that indicates, among various things, mappings between production device storage space and the locations of extents of host application data on the managed drives 221 and virtualized managed drives 223, 224, 225. In response to an IO 256 from the host application to access host device 252, an MPIO (Multi-Path Input-Output) driver 258 may determine whether the IO 256 can be serviced by accessing the host computer memory 200, a portion of which is a cache level. If that is not possible then the MPIO driver generates an IO 246 with reference to production device 254 and selects a path on which to send the IO 246 to the primary storage array 100. There are multiple paths $230_1$-$230_4$ between the host computer 108 and the primary storage array 100, e.g. one path per FE 216. Each path may have a locally unique address that is known to the MPIO driver 258. However, the host application is not aware of the paths and addresses because it views the host device 252 as being available via a single logical path. The paths may be selected by the MPIO driver based on a wide variety of techniques and algorithms including, for context and without limitation, performance and load balancing. In the case of a read IO 246 the primary storage array uses the metadata 254 to locate the requested data, e.g. in the shared cache 226, managed drives 221 and virtualized managed drives 223, 224, 225. If the requested data is not in the shared cache then it is temporarily copied into the shared cache from the managed drives or virtualized managed drives and sent to the host application via one of the computing nodes. In the case of a write IO 246 the storage array creates new metadata that maps the production device address with a location to which the data is written on the managed drives and virtualized managed drives. The shared cache 226 may enable the production device to be reachable via all of the computing nodes and paths, although the storage array can be configured to limit use of certain paths to certain production devices.

The managed drives 221 and virtualized managed drives 223, 224, 225 may be organized into different hierarchical performance tiers 0-n. For example, the managed drives may include tiers based on drive technology type, e.g. and without limitation SSDs at tier 0, Fibre Channel HDDs at tier 1, and SAS (Serial Attached SCSI) HDDs and SATA HDDs at tier n. The virtualized managed drives may include tiers based on drive technology type and network delay. In other words, tiers may be based on IOPS performance. Tier 0 is used to store extents of data that are "hot," e.g. likely to be accessed in the near future, for which various proxy indicators are known. Each extent may be associated with a contiguous area of storage, and the highest ranked extents are selected for storage at tier 0 because it exhibits the best access time. Tier 1 is used to store extents that are "warm." In particular, the next-highest ranked (after tier 0) extents of storage are selected for storage at tier 1. The remaining extents are stored at a tier lower than tier 1. Tier selection may be partly or completely automated by an automated tiering program 257. One aspect of selecting a tier at which to store a particular extent of data is temporal likelihood of IO activity. Near term expected IO activity associated with an extent of data may justify promotion of the extent to a higher tier of storage. Conversely, near term expected IO inactivity associated with an extent can justify demotion of the extent to a lower tier of storage. The tiering program monitors data access (IO) activity on a per-extent basis over time and generates hints to prompt promotion and demotion of extents. For example, the tiering program 257 may utilize statistical analysis algorithms to recognize data access patterns and generate hints that prompt promotion of certain extents to a higher storage tier if the calculations indicate that the data will be accessed in the near future or at some particular time (e.g., week, day, hour, minute etc.). The hints may also prompt demotion of extents.

Although the illustrated primary storage array includes a tiering program 257, in some implementations the primary storage array lacks a tiering program. In such implementations performance tiering may be provided as a storage capability. For example, storage virtualization storage arrays may be equipped with performance tiering. Further, the managed drives and virtualized managed drives may be managed as different performance tiers.

A data placement program 259 is responsive to the block backup statistics 122 to determine whether to store production device 254, i.e. on managed drives 221 or one of the virtualized managed drives 223, 224, 225. However, as mentioned above, the placement decisions made by the data placement program may be on the block, chunk, device, extent or other level. The placement decisions may be secondary to decisions made by the tiering program 257 when the primary storage array has a performance tiering capability. For example and without limitation, frequently accessed data that is promoted to tier 0 flash in the managed drives 221 by tiering program 257 would not necessarily be relocated to lower performance tier virtualized managed drives based on compressibility or some other capability by the data placement program because satisfying data access performance requirements of the host application is of greater importance than data reduction. However, a cost benefit function may be used to select a particular managed drive or virtualized managed drive provided that host application performance requirements will be satisfied. Operation of the data placement program 259 will be described in greater detail below.

Figure 3:
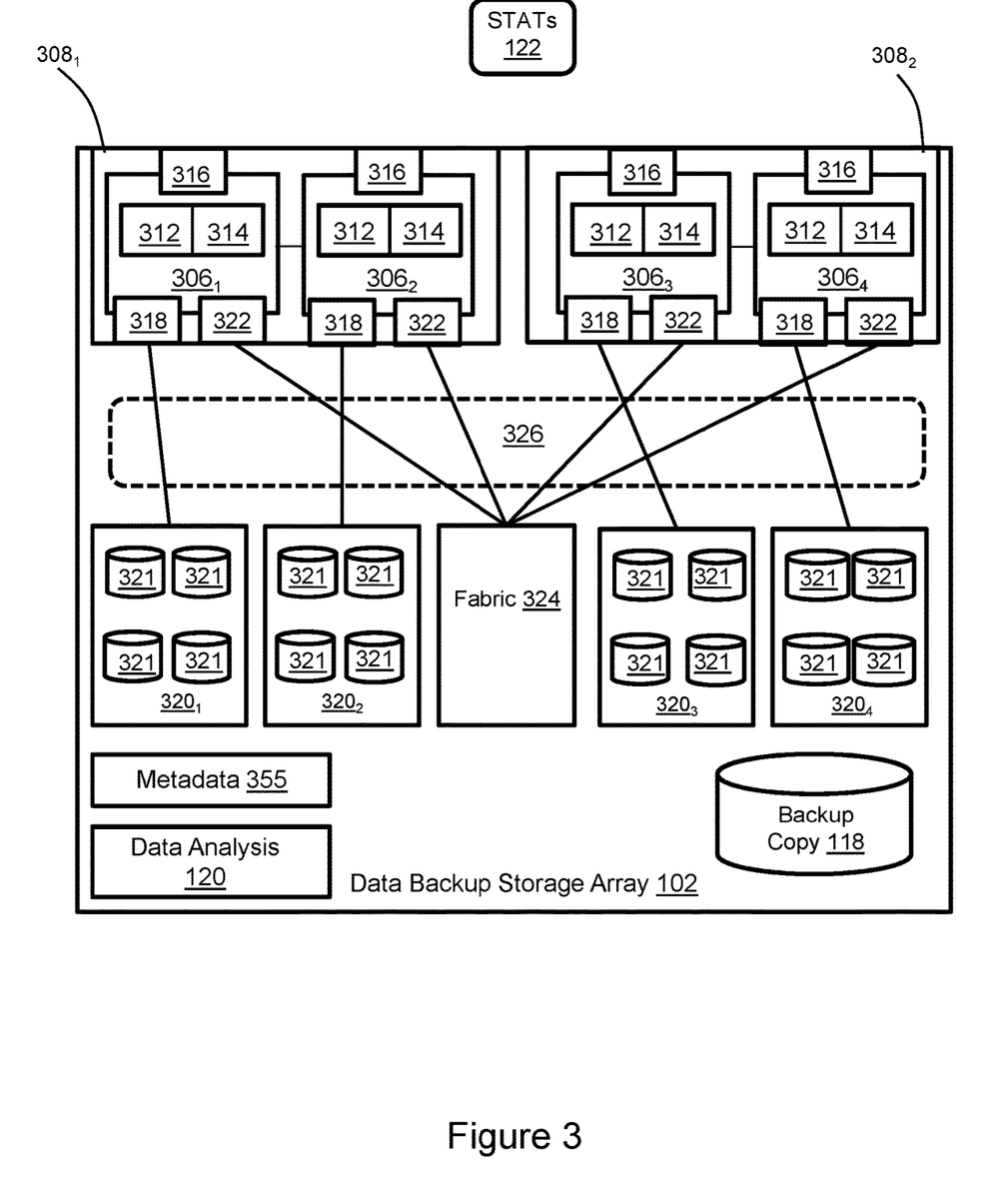
FIG. 3 illustrates the data backup storage array of FIG. 1 in greater detail.

FIG. 3 illustrates the data backup storage array 102 of FIG. 1 in greater detail. The data backup storage array may be a conventional storage array with computing nodes $306_1$-$306_4$, storage engines $308_1$, $308_2$, tangible multi-core processors 312, local cache 314, FEs 316, BEs 318, fabric 324, shared cache 326, managed drives 321 and other features such as metadata 355 and storage bays $320_1$-$320_4$. The data backup storage array maintains the backup copy 118 of production device 254 (FIG. 2). The backup copy may be a logical device. Although not specifically illustrated, the data backup storage array may also maintain backup copies of other production devices. Data analysis program 120 processes the backup copy 118 to qualify and/or quantify suitability of the host application data for placement on the storage virtualization storage arrays based on the associated storage capabilities. For example and without limitation, the data analysis program may calculate the compressibility of the backup copy (or parts thereof), a size reduction ratio from deduplication of the backup copy, a change rate of the backup copy, and a wide variety of other statistics. In some implementations the deduplication reduction ratio, compressibility, or both are determined by applying a deduplication and/or compression algorithm to the backup copy. It is not necessary that the same deduplication and compression algorithms are used on both the data backup storage array and the storage virtualization storage array because a first algorithm is generally suitable for predicting relative performance of a second algorithm. For example and without limitation, two compression algorithms may compress the same data by different amounts, but the compressibility of the data relative to the compressibility of other data can be predicted using either algorithm. Thus, the data backup storage array algorithms can be used to predict suitability of the storage virtualizations storage array algorithms. The statistics are used to generate block backup statistics 122 that are sent to the primary storage array. The calculations and generation of the block backup statistics may be performed repeatedly so that data may be moved in response to status changes.

Figure 4:
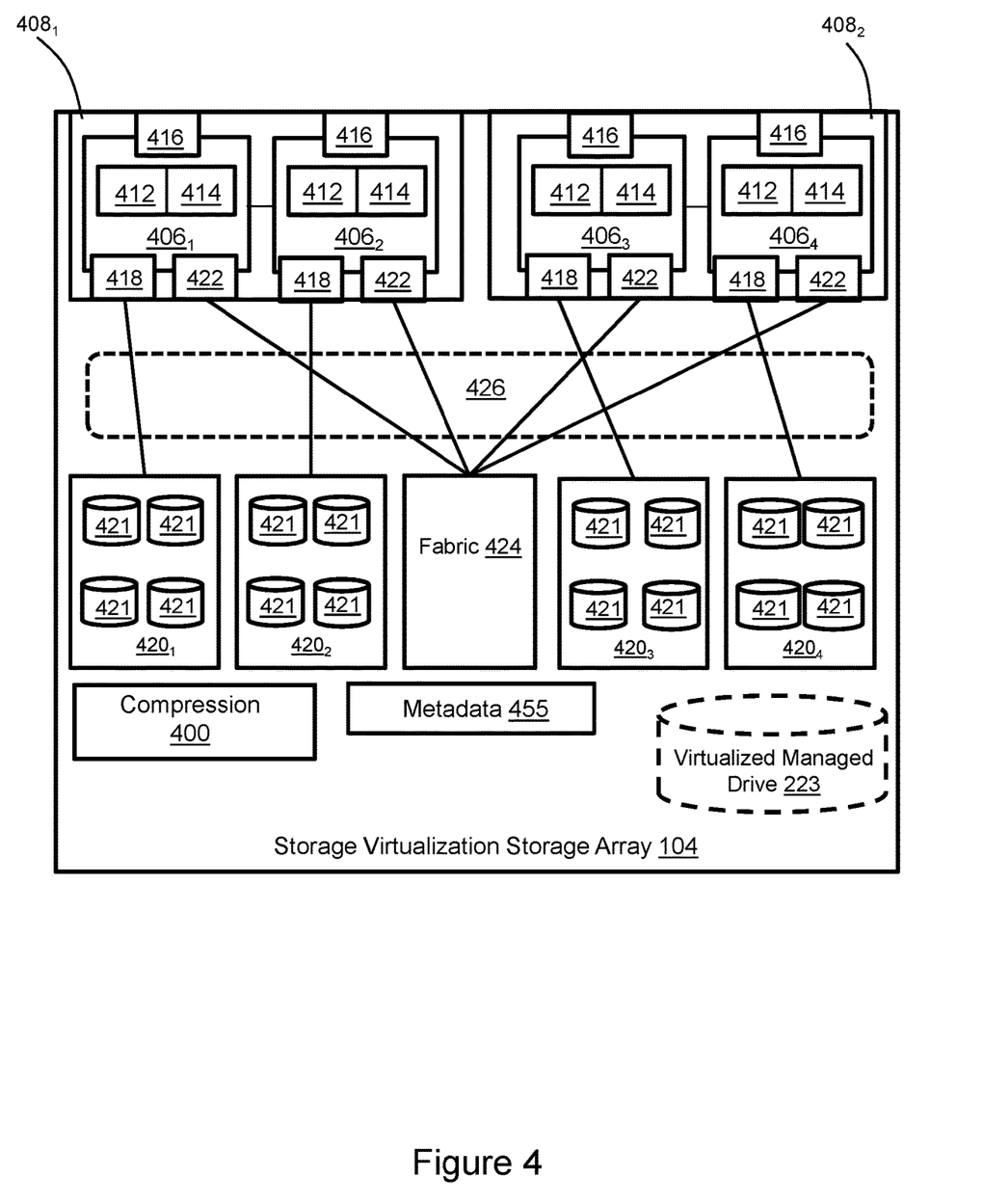
FIGS. 4, 5 and 6 illustrate the storage virtualization storage arrays of FIG. 1 in greater detail.

FIG. 4 illustrates the storage virtualization storage array 104 of FIG. 1 in greater detail. The storage virtualization storage array may be a conventional storage array with computing nodes $406_1$-$406_4$, storage engines $408_1$, $408_2$, tangible multi-core processors 412, local cache 414, FEs 416, BEs 418, fabric 424, shared cache 426, managed drives 421 and other features such as metadata 455 and storage bays $420_1$-$420_4$. The storage virtualization storage array 104 maintains the virtualized managed drive 223. The virtualized managed drive 223 of FIG. 1 is an abstraction layer between the primary storage array and the managed drives 421 of the storage virtualization storage array 104. In the illustrated example the storage virtualization storage array 104 includes a compression program 400 that provides a storage capability. However, any storage capability or set of storage capabilities might be included.

Figure 5:
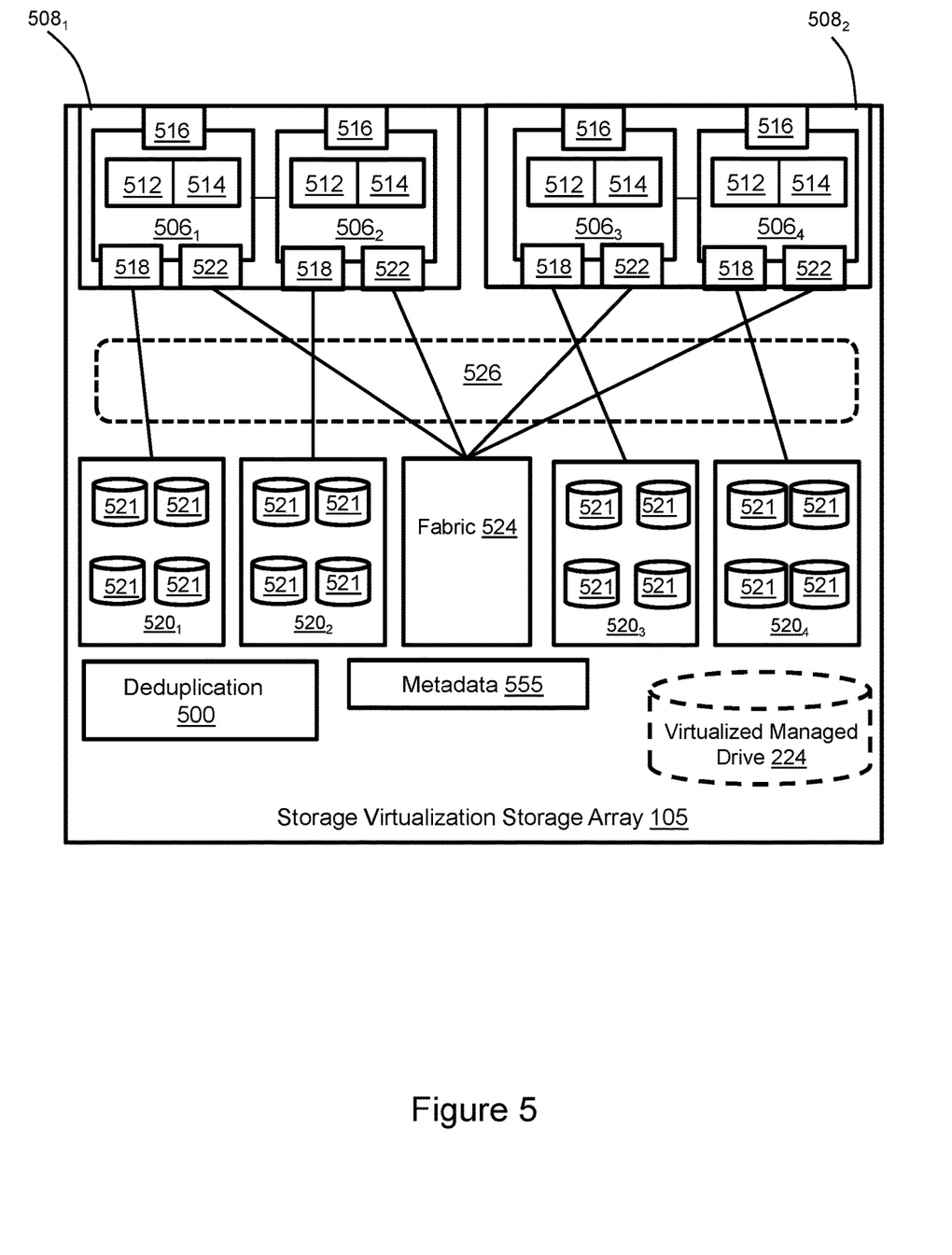

FIG. 5 illustrates the storage virtualization storage array 105 of FIG. 1 in greater detail. The storage virtualization storage array may be a conventional storage array with computing nodes $506_1$-$506_4$, storage engines $508_1$, $508_2$, tangible multi-core processors 512, local cache 514, FEs 516, BEs 518, fabric 524, shared cache 526, managed drives 521 and other features such as metadata 555 and storage bays $520_1$-$520_4$. The storage virtualization storage array 105 maintains the virtualized managed drive 224. The virtualized managed drive 224 of FIG. 1 is an abstraction layer between the primary storage array and the managed drives 521 of the storage virtualization storage array 105. In the illustrated example the storage virtualization storage array 105 includes a deduplication program 500 that provides a storage capability. However, any storage capability or set of storage capabilities might be included.

Figure 6:
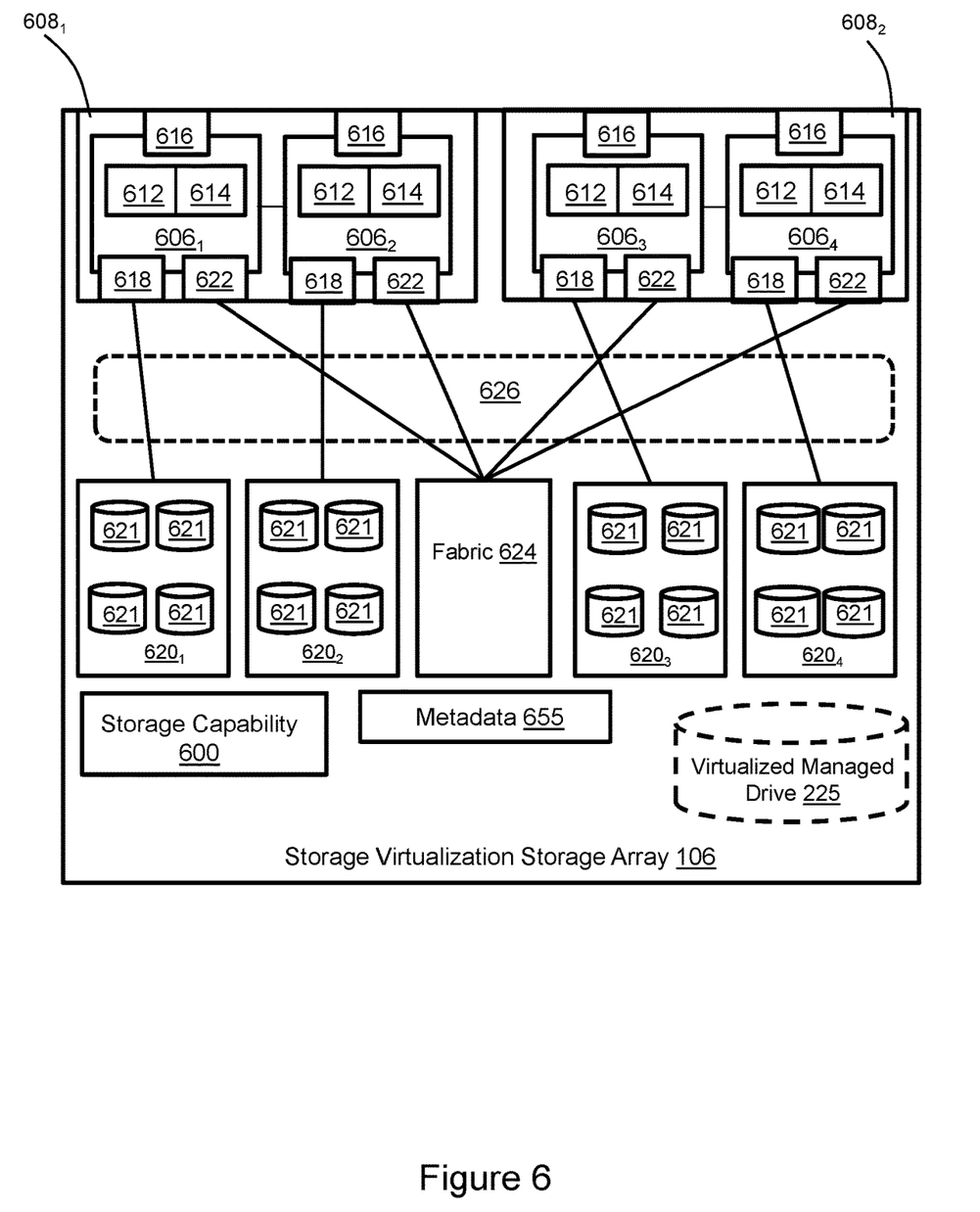

FIG. 6 illustrates the storage virtualization storage array 106 of FIG. 1 in greater detail. The storage virtualization storage array may be a conventional storage array with computing nodes $606_1$-$606_4$, storage engines $608_1$, $608_2$, tangible multi-core processors 612, local cache 614, FEs 616, BEs 618, fabric 624, shared cache 626, managed drives 621 and other features such as metadata 655 and storage bays $620_1$-$620_4$ove. The storage virtualization storage array 106 maintains the virtualized managed drive 225. The virtualized managed drive 225 of FIG. 1 is an abstraction layer between the primary storage array and the managed drives 621 of the storage virtualization storage array 106. In the illustrated example the storage virtualization storage array 106 includes a storage capability 600 that may include one or more of deduplication, compression, power conservation, performance tiering, remote replication, and support for a large predetermined number of snaps.

Figure 7:
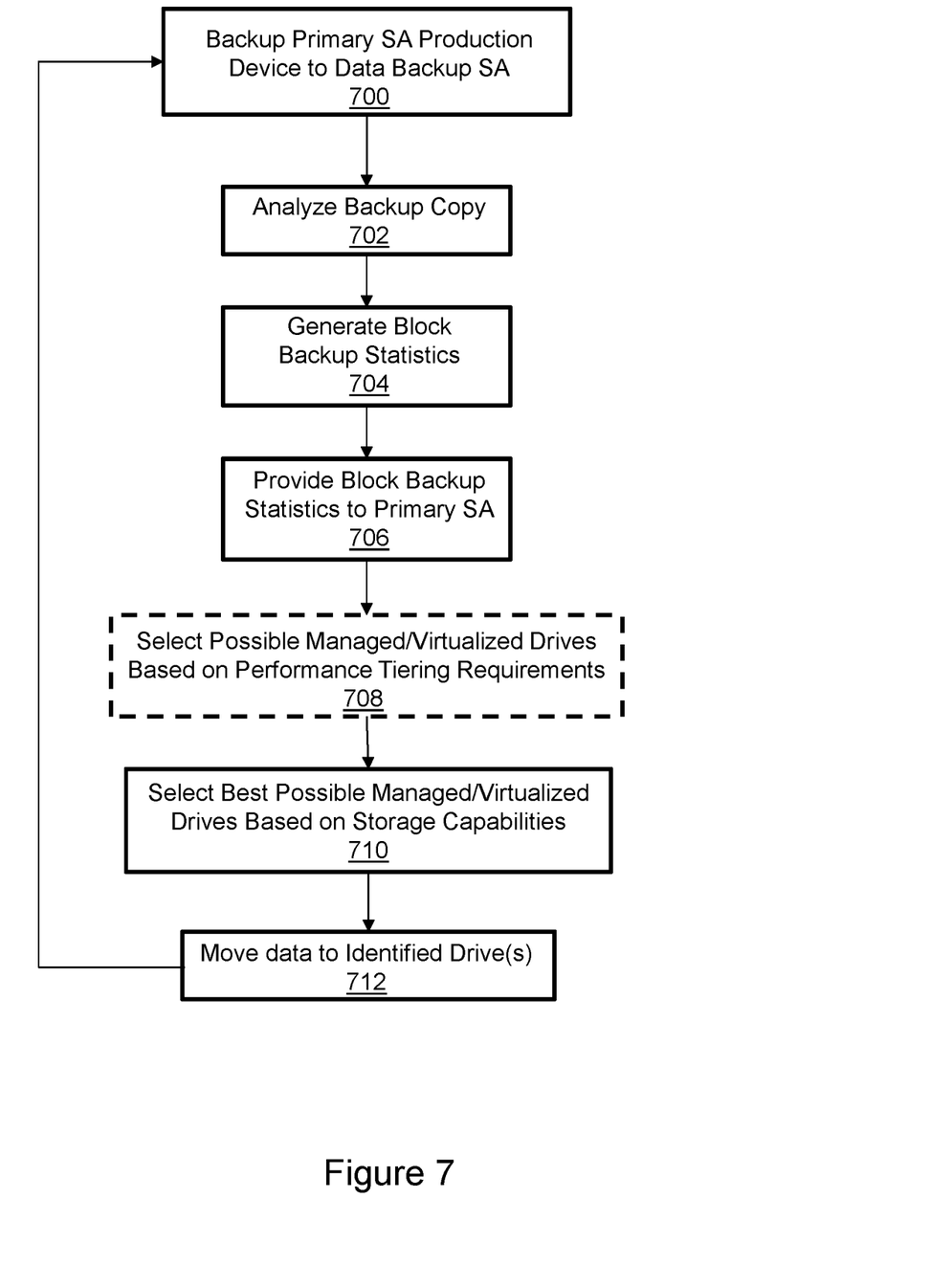
FIG. 7 illustrates a technique of managing data placement based on storage capabilities.

FIG. 7 illustrates a technique of managing data placement based on available storage capabilities on different virtualized managed drives. The production devices maintained by the primary storage array are backed up to the data backup storage array as indicated in block 700. The backup copy is analyzed as indicated in block 702. Block backup statistics are generated based on the analysis as indicated in block 704. The block backup statistics may represent the entire production device although, as mentioned above, other levels of granularity are possible. The block backup statistics are provided to the primary storage array as indicated in block 706. If the primary storage array is equipped with performance tiering then the primary storage array selects possible drives to store the production device from among the managed drives and virtualized managed drives based on performance tiering as indicated in contingent block 708. For example and without limitation, the managed drives and virtualized managed drives that satisfy host application performance requirements or tiering program hint indications in terms of IOPS may be identified as possible drives. The actions included in step 708 are not necessarily based on the block backup statistics because a primary storage array tiering program may have access to data access statistics generated within the primary storage array. The best suited managed drives and virtualized managed drives are then selected from the possible drives as indicated in block 710. In particular, the best suited drives based on comparison of the block backup statistics with the available storage capabilities are selected. For example and without limitation, virtualized managed drive 223 (FIG. 4) may be identified as the best drive for data that is highly compressible, or more compressible than other analyzed data, if the performance requirements associated with that data are satisfied by virtualized managed drive 223 (FIG. 4). Also for example and without limitation, virtualized managed drive 224 (FIG. 5) may be identified as the best drive for data that is highly reducible via deduplication, or more reducible than other analyzed data, if the performance requirements associated with that data are satisfied by virtualized managed drive 224 (FIG. 5). Also for example and without limitation, virtualized managed drive 225 (FIG. 6) may be identified as the best drive for data that is suitable for the storage capabilities on that storage virtualization storage array, or more suitable than other analyzed data, if the performance requirements associated with that data are satisfied by virtualized managed drive 225 (FIG. 6). Data that is not associated with the virtualized managed drives 223, 224, 225 (FIG. 2) through selection in block 710 will be selected for storage on the local managed drives 221 (FIG. 2) of the primary storage array. Data is then moved to the selected drives as indicated in block 712. The procedure is repeated as backups are performed. Consequently, the available data storage capabilities are more efficiently utilized than with random placement.

Where the primary storage array is not equipped with a performance tiering program block 708 is not performed. However, block 710 may include selection of managed drives or one of the virtualized managed drives based on performance tiering. For example and without limitation, the production volume may be selected for storage on a storage virtualization storage array that is equipped with a performance tiering program. Also for example and without limitation, the production volume may be selected for storage on a managed drive or one of the virtualized managed drive based on the performance capabilities of those drives.

Although the data analysis program is implemented in the data backup storage array in the example described above, a variety of implementations are possible. For example and without limitation, the analysis program could be implemented in the primary storage array or some other device. Further, data could be heuristically analyzed based on movement to a variety of storage virtualization storage arrays to find the best result. However, the data backup storage array may provide some advantage due to available computing capacity, access to the entire backup copy, access to information including but not limited to change rate from backups, and possible presence of storage capabilities such as deduplication and compression. For example, if the data backup storage array uses deduplication, compression or both then the deduplication and compression ratios are already available. Change rate is also readily available so if a production device changes frequently then a higher performance tier may be justified, and vice versa. Because it is common to use legacy equipment for storage virtualization and sometimes for backup the concepts described above may enable storage capabilities of legacy equipment to be implemented with a non-legacy primary storage array that lacks those storage capabilities.

A number of features, aspects, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
   in a data storage system comprising a primary storage array with managed drives and a first storage virtualization storage array that maintains a first virtualized managed drive, where the first storage virtualization storage array has a first storage capability that the primary storage array lacks:
   quantifying, for each extent of data of a plurality of extents of data, suitability for processing of that extent of data by the first storage capability;
   selecting a most suitable extent of data based on quantified suitability; and
   moving the selected most suitable extent of data to the first virtualized managed drive.

2. The method of claim 1 wherein the data storage system comprises a data backup storage array with a backup copy of a production device of the primary storage array, and comprising analyzing the backup copy with a data analysis program running on the data backup storage array to quantify suitability for processing each extent of data by the first storage capability.

3. The method of claim 2 comprising the data analysis program generating block backup statistics that represent quantified suitability for processing each extent of data by the first storage capability.

4. The method of claim 3 comprising the primary storage array selecting a set of possible drives from the virtualized managed drive and the managed drives based on performance tiering.

5. The method of claim 4 comprising selecting at least one drive of the set of possible drives based on the quantified suitability for processing each extent of data by the first storage capability.

6. The method of claim 5 wherein the data storage system comprises a second storage virtualization storage array that maintains a second virtualized managed drive, where the second storage virtualization storage array has a second storage capability that the primary storage array and the first storage virtualization storage array lack, and comprising the data analysis program running on the data backup storage array quantifying suitability for processing each extent of data by the second storage capability.

7. The method of claim 6 comprising the data analysis program generating block backup statistics that represent quantified suitability for processing each extent of data by the first storage capability and the second storage capability.

8. The method of claim 7 comprising selecting at least one drive of the set of possible drives based on the quantified suitability for processing each extent of data by the first storage capability and the second storage capability.

9. The method of claim 1 wherein the first storage capability is one of: deduplication, compression, power conservation, performance tiering, remote replication, and support for a predetermined number of snaps, and comprising quantifying suitability of a production device with respect to the first storage capability.

10. The method of claim 1 wherein the second storage capability is one of: deduplication, compression, power conservation, performance tiering, remote replication, and support for a predetermined number of snaps, and comprising quantifying suitability for of a production device with respect to the second storage capability.

11. An apparatus comprising:
a primary storage array with managed drives;
a first storage virtualization storage array that maintains a first virtualized managed drive, where the first storage virtualization storage array has a first storage capability that the primary storage array lacks; and
an analysis program on non-transitory computer-readable memory that:
quantifies, for each extent of data of a plurality of extents of data, suitability for processing of that extent of data by the first storage capability;
selects a most suitable extent of data based on quantified suitability; and
moves the selected most suitable extent of data to the first virtualized managed drive.

12. The apparatus of claim 11 wherein the data storage system comprises a data backup storage array with a backup copy of a production device of the primary storage array, and wherein the analysis program runs on the data backup storage array and analyzes the backup copy to quantify suitability for processing each extent of data by the first storage capability.

13. The apparatus of claim 12 wherein the data analysis program generates block backup statistics that represent quantified suitability for processing each extent of data by the first storage capability.

14. The apparatus of claim 13 wherein the primary storage array comprises a tiering program on non-transitory computer-readable memory that selects a set of possible drives from the virtualized managed drive and the managed drives based on performance.

15. The apparatus of claim 14 wherein the primary storage array comprises a data placement program on non-transitory computer-readable memory that selects at least one drive of the set of possible drives based on the quantified suitability for processing each extent of data by the first storage capability.

16. The apparatus of claim 15 further comprising a second storage virtualization storage array that maintains a second virtualized managed drive, where the second storage virtualization storage array has a second storage capability that the primary storage array and the first storage virtualization storage array lack, and wherein the data analysis program running on the data backup storage array quantifies suitability for processing each extent of data by the second storage capability.

17. The apparatus of claim 16 wherein the data analysis program generates block backup statistics that represent quantified suitability for processing each extent of data by the first storage capability and the second storage capability.

18. The apparatus of claim 17 wherein the data placement program selects at least one drive of the set of possible drives based on the quantified suitability for processing each extent of data by the first storage capability and the second storage capability.

19. The method of claim 1 wherein the first storage capability and the second storage capability are each one of: deduplication, compression, power conservation, performance tiering, remote replication, and support for a predetermined number of snaps.

20. A system comprising:
a primary storage array with managed drives and a production device;
a data backup storage array with a backup copy of the production device;
a storage virtualization storage array that maintains a virtualized managed drive, where the storage virtualization storage array has a storage capability that the primary storage array lacks; and
an analysis program on non-transitory computer-readable memory of the data backup storage array that:
quantifies suitability for processing the production device with the storage capability; and
generates block backup statistics that represent quantified suitability for processing the production device with the storage capability; and
a data placement program on non-transitory computer-readable memory of the primary storage array that:
selects either the managed drives or the virtualized managed drive for storage of the production device based on the block backup statistics; and
moves the production device in accordance with the selection.

* * * * *